Nov. 27, 1962

P. DE VRIES ET AL 3,065,906

CARRIAGE SHIFT MECHANISM

Filed Oct. 2, 1959

INVENTORS
PIETER DE VRIES
FRANCISCUS H. J. FLUITMAN
BY

George V. Hall

ATTORNEY

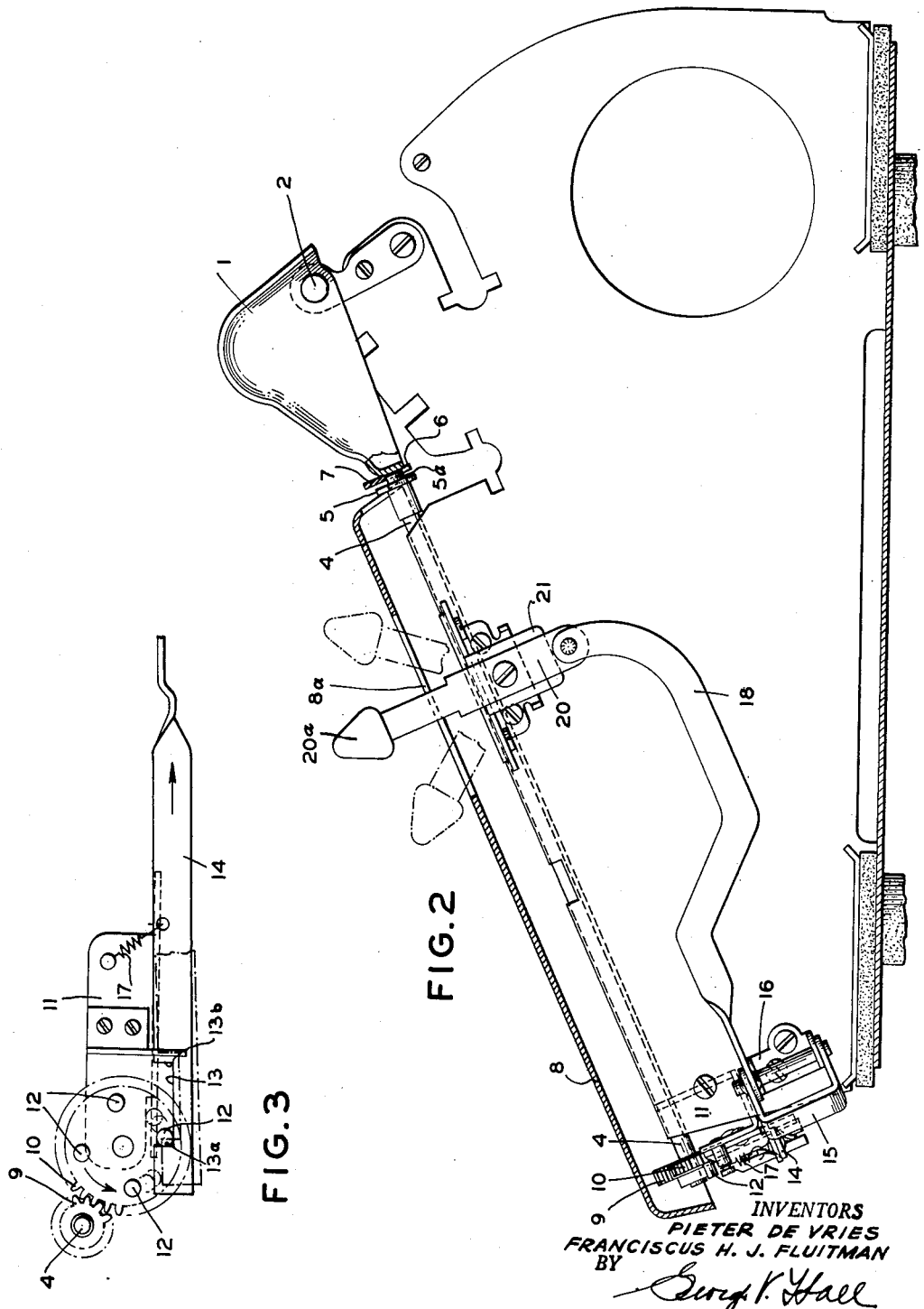

United States Patent Office 3,065,906
Patented Nov. 27, 1962

3,065,906
CARRIAGE SHIFT MECHANISM
Pieter de Vries and Franciscus H. J. Fluitman, Amsterdam, Netherlands, assignors to Monroe Calculating Machine Company, Orange, N.J., a corporation of Delaware
Filed Oct. 2, 1959, Ser. No. 843,995
7 Claims. (Cl. 235—63)

The invention relates to carriage shifting mechanism for calculating machines and more particularly to improvements in carriage shifting mechanism of the manually operable type disclosed in Reissue Patent No. 13,842, dated December 8, 1914.

The carriage shifting mechanism of the above patent includes crank means which engages the front of the carriage. A denominational shift of the carriage in one direction is effected upon 180° rotation of the crank means in a given direction, and upon 180° rotation of the crank means in the reverse direction the carriage is shifted one denominational position in the opposite direction.

Means for rotating the crank means comprises a shaft fixed thereto and extending forwardly under the machine keyboard. At its front end and forwardly of the keyboard, the shaft is provided with an operating handle for directly rotating said shaft and the crank means. This arrangement for rotating the crank means has certain disadvantages, to wit:

The operating handle is quite remote from the machine function keys. The operation of the machine is therefore slowed as the operator's hand must move between the function keys and the shift handle in desirable single-handed operation.

The twisting action necessary for operation of the shift handle is more difficult and awkward than would be a direct push or pull operation.

The operating handle which projects forwardly of the machine may be caught in the operator's or a passerby's clothing.

It is accordingly one of the primary objects of the invention to facilitate operation of the carriage shifting means.

Another object of the invention is to provide means whereby the shift operating handle may be located in a particularly advantageous position.

A further object of the invention is to provide shift operating means including an operating handle or knob which is operated by a push or pull action.

Another object of the invention is to locate the shift operating handle in a position where it does not project outwardly from the machine.

Other objects and advantages of the invention will be evident from the following description with reference to the accompanying drawings in which:

FIG. 2 is a right side view of the calculating machine embodying the carriage shift mechanism with the side cover removed and with parts in section.

FIG. 3 is a fragmentary front view of the shift operating train with the parts in an operated position.

Figure 1:
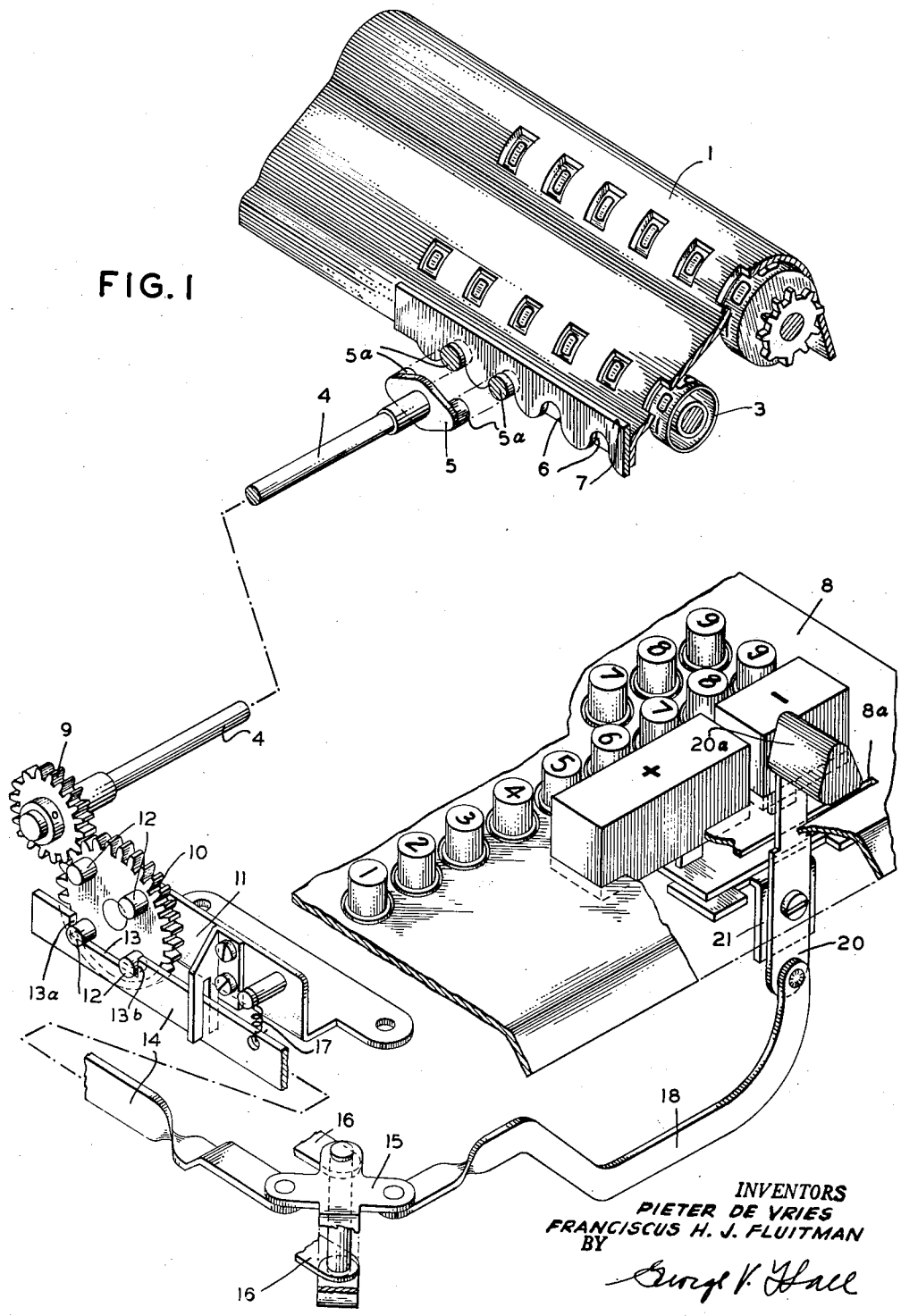
FIG. 1 is a fragmentary perspective view of a calculating machine including the carriage shift mechanism.

The carriage 1 (FIGS. 1, 2) is provided at its rear with a shaft 2 (FIG. 2) extending between the end plates thereof and slidably and rotatably mounted in the side frames of the machine. The carriage is therefore adapted to be raised at its front to disengage gears (not shown) of wheels 3 of the accumulator register from transmission gears (not shown) in the body of the machine so that the carriage may be longitudinally shifted.

As fully disclosed in the aforenoted patent, carriage 1 is shifted one denominational position upon a 180° turn of a shaft 4 which is journaled in suitable bearings beneath the keyboard 8 of the machine.

The means whereby carriage 1 is shifted upon rotation of shaft 4 includes a double arm crank 5 mounted at the rear end of the shaft and provided with a pair of diametrically opposed rollers 5a. Rollers 5a are equidistantly spaced from shaft 4, and when carriage 1 is in normal lowered position, the rollers lie in a horizontal plane (FIG. 1) and respectively engage a scalloped recess 6 in the lower edge of a rail 7 at the front edge of the carriage. Rollers 5a, therefore, act to support the front of the carriage when it is in normal lowered position.

Crank 5 is rotated by shaft 4 a half turn clockwise (FIG. 1) to effect a right shift of one order and counterclockwise to effect a left shift. When crank 5 is rotated clockwise, for example, the leftmost roller 5a in engagement with a recess 6 will, through the first 90° of travel, raise the carriage pivotally and at the same time move it toward the right. During this movement, the rightmost roller 5a of crank 5 will be moved downwardly from engagement with its recess 6 in rail 7 as the front of the carriage is moved upwardly. When crank 5 has passed the 90° point, no further application of power to shaft 4 is necessary to complete the shift, as the weight of the carriage assisted by a pair of locators (not shown) will urge said crank further in clockwise direction to complete the half turn as the carriage moves downwardly and to the right into shifted position.

The devices of the invention comprise a power transmission train for rotating shaft 4. The train includes a pinion 9 fast on the front end of shaft 4 and meshing with a spur gear 10 mounted on a suitable bracket 11 at the front of the machine casing and inwardly of and below the front edge of keyboard 8. The ratio between pinion 9 and gear 10 is two to one and therefore one-quarter turn of gear 10 will effect a one-half turn of pinion 9, shaft 4 and crank 5 to shift carriage 1 one denominational step of movement as previously described.

Means for rotating gear 10 includes four pins 12 extending outwardly from the front face of the gear at equal distances radially and equidistantly spaced circumferentially. Normally a pair of pins 12 are in a horizontal lower plane and engage an elongated square end recess 13 at the top left free end of a transversely disposed link 14 which at its right end is pivotally connected to the left arm of a crank 15 (FIG. 1). Crank 15 is supported by a suitable bracket 16 which is mounted at the front of the right side plate (FIG. 2) of the machine frame below keyboard 8.

A spring 17 normally holds the left free end (FIG. 1) of link 14 in a raised centralized position with the horizontal edge of recess 13 engaging the lowermost pair of pins 12. Furthermore the left vertical edge 13a of the recess normally engages the leftmost of these pins and the right vertical edge 13b engages the rightmost pin. Accordingly link 14 is normally held in a raised and longitudinally centralized position.

As will later appear, the left end of link 14 is moved a slight distance downwardly in a carriage shifting operation and then restored. The pivotal connection of link 14 with crank 15 would prevent a large movement of said link in this direction. However the looseness of the pivotal connection permits the small necessary movement of link 14 without interference.

A rearwardly extending link 18 is pivotally connected at its front end to the right arm of crank 15 (FIG. 1), and at its rear end the link is pivotally connected to the lower arm of a lever 20 which is normally disposed in substantially vertical position. Lever 20 is mounted on a bracket 21 secured beneath keyboard 8 adjacent its right edge and extends upwardly through a suitable opening 8a in the keyboard to the right of and adjacent plus and minus bars 22, 23.

At its upper end lever 20 is provided with an operating handle or knob 20a which is adapted to be moved, as shown in the dot-dash lines of FIG. 2, toward the rear of the machine to rock lever 20 clockwise from its vertical position and is adapted to be moved toward the front of the machine to rock the lever counterclockwise. Clockwise movement of lever 20 will effect one denominational left shift of carriage 1 whereas counterclockwise movement will effect a right shift. A right shift operation will now be described with particular reference to FIG. 3.

Counterclockwise movement of lever 20 will move link 18 rearwardly, rock crank 15 counterclockwise from the position of FIG. 1, and move link 14 to the right as shown in FIG. 3. When link 14 is moved to the right, left edge 13a of recess 13 will, because of its engagement with the leftmost lower pin 12, rotate gear 10 counterclockwise. Pinion 9, shaft 4, and crank 5 therefore will be rotated clockwise in a right shift operation.

It has been noted that gear 10 will be rotated one-quarter of a turn and crank 5 one-half a turn in a shifting operation, and furthermore that after crank 5 has completed half of its movement, the weight of the carriage assisted by the locators will complete the operation. Therefore after gear 10 has completed half of its movement, it will be rotated to its full quarter turn without any further urge by link 14. In this operation, the pin 12 which is counterclockwise from the pin 12 which is engaged by edge 13a of recess 13, will be rotated counterclockwise into engagement with the upper edge of link 14 to the left of recess 13 thereby moving the left end of link 14 downwardly as shown by the dot-dash lines of FIG. 3. At the same time, the pin 12 which is engaged by edge 13a will be rotated counterclockwise from engagement therewith also as shown by the dot-dash lines.

After the above operation and release of knob 20a, spring 17 will be effective to restore link 14 to the left until recess 13 is brought into registration with the now lowermost pair of horizontally disposed pins 12 and lever 20 is centralized. Thereupon the left end of link 14 will be restored upwardly by spring 17 to engage recess 13 with the pair of pins 12 thereby restoring the parts to the normal position of FIG. 1 in which position they may again be selectively operated.

In a left shift operation, link 14 will be moved to the left and edge 13b of recess 13, engaging a pin 12, will be effective to rotate gear 10 clockwise. In this operation, the left end of link 14 will be moved downwardly by a pin 12 engaging the arm to the right of recess 13, and after release of knob 20a spring 17 will restore link 14 to the right and upwardly to engage recess 13 with the lowermost pair of pins 12. Otherwise the operation, as will be obvious, is the same in principle as described for the right shift operation.

We claim:

1. In a calculating machine having a denominationally shiftable carriage, a keyboard including digital value keys located forwardly of said carriage, and rotary crank means engaging the front of said carriage and operable upon one-half turn in a given direction to effect one denominational right shift of said carriage and operable upon one-half turn in the opposite direction to effect one denominational left shift of said carriage; means for rotating said crank means, comprising an operating member extending upwardly through said keyboard to the right of said digital value keys and selectively movable from a normal central position toward the front and toward the rear of the machine, a transmission train between said operating member and said crank means operable upon movement of said operating member toward the rear of the machine to turn said crank in one of said directions and operable upon movement of said operating member toward the front of the machine to turn said crank in the other of said directions, and resilient means normally operable to restore said operating member to said central position.

2. In a calculating machine having a denominationally shiftable carriage, a keyboard including digital value keys located forwardly of said carriage, and rotary crank means engaging the front of said carriage and operable upon one-half turn in a given direction to effect one denominational right shift of said carriage and operable upon one-half turn in the opposite direction to effect one denominational left shift of said carriage; means for rotating said crank means, comprising a shaft on which said crank means is fast and which extends forwardly beneath said keyboard, a gear fast at the front end of said shaft, an operating member extending upwardly through said keyboard to the right of said digital value keys and selectively movable from a normal central position toward the front and toward the rear of the machine, a transmission train between said operating member and said gear operable upon movement of said operating member toward the rear of the machine to rotate said gear in one direction and operable upon movement of said operating member toward the front of the machine to rotate said gear in the opposite direction, and resilient means normally operable to restore said operating member to said central position.

3. In a calculating machine having a denominationally shiftable carriage, a keyboard including digital value keys located forwardly of said carriage, and rotary crank means engaging the front of said carriage and operable upon one-half turn in a given direction to effect one denominational right shift of said carriage and operable upon one-half turn in the opposite direction to effect one denominational left shift of said carriage; means for rotating said crank means, comprising a shaft on which said crank means is fast and which extends forwardly beneath said keyboard, a gear fast on the front of said shaft, an operating member comprising a lever fulcrumed on an axis transversely of said machine beneath said keyboard and extending upwardly through said keyboard to the right of said digital value keys, a transmission train between said lever and said gear operable upon rocking movement of said lever from a central position in one direction to rotate said gear in a given direction and operable upon rocking movement of said lever from said central position in the opposite direction to rotate said gear in the reverse direction, and resilient means normally operable to locate said lever in said central position.

4. In a calculating machine having a denominationally shiftable carriage; means for shifting said carriage including a gear operable by a step of movement in one direction to shift said carriage one denominational position in a given direction and operable by a step of movement in the reverse direction to shift said carriage one denominational position in the opposite direction; means for stepping said gear, comprising a plurality of pins equidistantly spaced circumferentially and projecting outwardly from a face of said gear, a link having a free end and a longitudinal recess for engaging an adjacent pair of said pins, mounting means for the opposite end of said link for permitting pivotal and longitudinal movement thereof, spring means for biasing said link pivotally to engage said recess with said adjacent pair of pins, and means for selectively imparting longitudinal movement to said link in either direction.

5. In a calculating machine having a denominationally shiftable carriage, a keyboard including digital value keys located forwardly of said carriage, and rotary crank means engaging the front of said carriage and operable upon one-half turn in a given direction to effect one denominational right shift of said carriage and operable upon one-half turn in the opposite direction to effect one denominational left shift of said carriage; means for rotating said crank means, comprising a shaft on which said crank means is fast and which extends forwardly beneath said keyboard, a gear fast on the front of said shaft, an operating member comprising a lever fulcrumed on an axis transversely of said machine beneath said keyboard and extending upwardly through said keyboard to the right of said digital value keys, a forwardly extending link pivotally connected at its rear to said lever and pivotally connected at its front to an arm of a two-armed crank, a transversely extending link having its right end pivotally connected to the other arm of said two-armed crank, resilient means normally operable to hold the train comprising said links, said two-armed crank and said lever in a centralized position, and means operable by said transversely extending link upon rocking movement in one direction of said lever from said centralized position to rotate said gear in a given direction and operable upon rocking movement of said lever in the opposite direction from said centralized position to rotate said gear in the reverse direction.

6. In a calculating machine having a denominationally shiftable carriage, a keyboard including digital value keys located forwardly of said carriage, and rotary crank means engaging the front of said carriage and operable upon one-half turn in a given direction to effect one denominational right shift of said carriage and operable upon one-half turn in the opposite direction to effect one denominational left shift of said carriage; means for rotating said crank means, comprising a shaft on which said crank means is fast and which extends forwardly beneath said keyboard, a pinion fast on the front of said shaft, a gear meshing with said pinion, four pins extending outwardly from a face of said gear and equidistantly spaced circumferentially, a transversely disposed link having its right end pivotally connected to one arm of a two-armed crank, said transverse link having its left end free and having a longitudinal recess in its upper edge adjacent said free end, spring means urging the left end of said link upwardly to engage said recess with an adjacent pair of said pins, a rearwardly extending link pivotally connected at its front end with the other arm of said two-armed crank and pivotally connected at its rear to a lever extending upwardly through said keyboard to the right of said digital value keys and fulcrumed on an axis transversely of said machine beneath said keyboard.

7. In a calculating machine having a denominationally shiftable carriage, a keyboard located forwardly of said carriage including digital value keys and operation control keys located to the right of said digital value keys, shift means engaging said carriage and operable in a right shift movement to effect one denominational right shift of said carriage or alternatively in a left shift movement to effect one denominational left shift of said carriage; means for operating said shift means, comprising a manually operable lever fulcrumed on an axis transversely of said machine beneath said keyboard and extending upwardly through said keyboard immediately adjacent said operation control keys, a transmission train between said lever and said shift means operable upon rocking movement of said lever from a central position in one direction to transmit a right shift movement to said shift means and operable upon rocking movement of said lever from said central position in the opposite direction to transmit a left shift movement to said shift means, and resilient means normally operable to restore said lever to said central position.

References Cited in the file of this patent
UNITED STATES PATENTS

| Re. 13,842 | Baldwin | Dec. 8, 1914 |
| 1,631,033 | Hoffmeister | May 31, 1927 |
| 1,986,888 | Friden | Jan. 8, 1935 |